United States Patent
Sivalingham

(10) Patent No.: US 8,472,919 B1
(45) Date of Patent: Jun. 25, 2013

(54) NETWORK BASED TECHNIQUE FOR OBTAINING OPERATOR IDENTIFIER FOR MOBILE DEVICES

(75) Inventor: Sanjeevan Sivalingham, San Jose, CA (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/247,651

(22) Filed: Sep. 28, 2011

(51) Int. Cl.
*H04M 1/66* (2006.01)
*H04M 1/68* (2006.01)
*H04M 3/16* (2006.01)

(52) U.S. Cl.
USPC .............. 455/410; 455/411; 705/418; 705/34

(58) Field of Classification Search
USPC ................................ 455/405–417, 422.1, 445
See application file for complete search history.

(56) References Cited

U.S. PATENT DOCUMENTS

| | | | |
|---|---|---|---|
| 2008/0219420 A1* | 9/2008 | Gerber | 379/112.01 |
| 2009/0234780 A1* | 9/2009 | Drucker et al. | 705/418 |
| 2010/0153246 A1* | 6/2010 | D'Englere | 705/34 |

* cited by examiner

*Primary Examiner* — Kashif Siddiqui

(57) ABSTRACT

Efficient network based techniques can be implemented in the equipment of an operator of a mobile communication network to automatically obtain an operator or billing identifier associated with a mobile device of a user or subscriber associated with the network. Such techniques can be utilized even when a client application program on the device is restricted by the device manufacturer from providing the operator's billing identifier in communications through the mobile network with an associated application server. The operator identifier associated with the user's mobile device can be obtained without significantly impacting system resources, performance, or user experience.

25 Claims, 6 Drawing Sheets

NETWORK BASED TECHNIQUE FOR OBTAINING OPERATOR IDENTIFIER FOR MOBILE DEVICES

TECHNICAL FIELD

The present subject matter relates to techniques and equipment to allow application server equipment of an operator of a mobile communication network to automatically obtain an operator or billing identifier of a mobile device, even in scenarios in which a manufacture of the device has restricted a client application program on the device from providing the operator's billing identifier in the communications with the associated application server.

BACKGROUND

In recent years, mobile communication services have expanded and increased in popularity around the world. Many operators of modern mobile communication networks offer their users or subscribers advanced data communication services, in addition to standard wireless mobile communication services such as for voice calls or mobile messaging services (e.g., text and/or multimedia) and data transport services (e.g., for Internet access, or third party email or content access). Advanced application layer data services, from the carriers and third party providers, may take various forms and may include different subscription-based services. For example, such subscription-based services provided by the mobile network operator or wireless carrier may allow a user/subscriber to purchase or access premium data content (e.g., streaming video) directly from the user's mobile device via, for example, a client application program executing on the device and have the charges for the premium service included on the mobile service bill from the mobile network operator or wireless carrier.

In general, a mobile network operator relies on a unique operator or billing identifier associated with the particular mobile device user to identify the user (or user account) in order to bill the user's account directly for the particular service purchased or accessed by the user at the mobile device (e.g., via the client application). An example of an operator/billing identifier that is commonly used by mobile network operators is the telephone number associated with a mobile device of the user. This number may be referred to as the Mobile Directory Number (MDN) in 3rd Generation Partnership Project 2 (3GPP2) wireless network systems or the Mobile Subscriber Integrated Services Digital Network Number (MSISDN) in 3rd Generation Partnership Project (3GPP) systems.

However, the mobile network operator may not have an efficient way to determine the billing identifier based on the information received from the client application at the operator's application server. For example, the billing identifier may be not included in the data communication requests from the client application to the associated application server configured to provide the user-requested service or transaction through the mobile communication network. In some cases, this may be due to the type of mobile device or operating system environment on which the client application is executing. For example, the device manufacturer or operating system developer may restrict the client application from accessing the identifier assigned to the mobile device by the operator directly from the mobile device, instead requiring an application configuration that uses a different type of identifier, such as one assigned by the operating system developer. Such an operating system configuration precludes the client application from providing the identifier in communications with the associated application server.

One example of such a mobile computing platform is the "iPhone OS" or "iOS" mobile operating system from Apple Inc. of Cupertino, Calif. Current versions of the application programming interface (API) for this particular operating system do not provide a capability to determine the network operator's billing identifier programmatically from the mobile device itself. Instead, the application can only obtain and use a different identifier, for example, a device identifier specified by the manufacturer of the device (e.g., the unique device identifier or "UDID" associated with iOS devices). Consequently, for any mobile device with the iOS operating system or other operating system that presents a similar type of problem, network operators must rely on the manufacturer of the device or the API developer/publisher (e.g., Apple Inc.) for obtaining the operator assigned device identifier based on a mapping of the manufacturer's device identifier (e.g., the UDID in the iOS example) to the operator identifier for billing purposes. This involves the device manufacturer or operating system developer in the commercial transactions that occur between the operator and the operator's mobile service customers, which may be undesirable for the operator.

Other conventional techniques are available to mobile network operators for obtaining the operator assigned identifier, without the aid of the device manufacturer or API developer. For example, the application server may track the IP address associated with the mobile device for purposes of identifying the operator identifier (e.g., MDN) associated with the device for data communications. In this example, the application server uses one or more elements in the mobile communication network itself to determine the appropriate operator identifier (ID) based on the IP address associated with the device (e.g., a carrier database that maintains a mapping between operator ID and IP address assigned for each mobile device). However, performing such an operation is operationally intensive as it requires the carrier database to track IP address assignment for each mobile device and the application server to make this determination for each data communication from the device as the assigned IP address and/or associated operator ID for the device may have changed since the previous request. For example, each IP address-to-operator ID mapping must be tracked over time, including each time a new IP address is assigned to the device and each time any previously assigned IP address that is associated with an operator identifier for the device is modified.

In addition, a unique static or dynamic IP address may need to be assigned to the mobile device so as to uniquely map the IP address with the appropriate operator identifier and therefore, ensure the identifier associated with the device is correctly identified. This unique IP address would remain dedicated to the device for as long as there is active data traffic associated with the IP data flow. However, assigning a dedicated IP address to the mobile device for an indefinite period of time would reduce the number of IP addresses available for use in the network. This would be a significant problem for the mobile communication network as the current availability of global IP version 4 (IPv4) addresses becomes increasingly scarce.

To mitigate problems associated with limited supplies of IP addresses, modern mobile network systems may rely on network address translation (NAT) schemes. However, such NAT schemes typically use a relatively small pool of available IP addresses, which are shared concurrently amongst mobile devices for enabling data communications to other devices, which, for example, are external to the mobile communication network through the Internet. Therefore, assigning a unique IP address to each mobile device, to allow an application server to determine each mobile device operator identifier may be incompatible with the NAT scheme of the communication network.

Other techniques exist that do not require a dedicated IP address to be permanently assigned in order to obtain the operator identifier. For example, the application server may require the user to supply the MDN, for example, as part of a validation process based on short message service (SMS) or multimedia messaging service (MMS) messages. However, such techniques generally lead to reduced user experience as several user interactions are required merely to obtain the MDN.

Also, any validation process that is dependent on user input is generally susceptible to human error (e.g., user enters a wrong MDN) or to improper or fraudulent use. In an example, one user (User B) may provide an MDN belonging to another cooperating user (User A) for advanced data services for which only User A has a valid subscription. The application server may subsequently send a validation request in the form of an SMS message based on the provided MDN, which would therefore reach User A. User A can then send another SMS message with authentication information in response to the validation request from the server so as to complete the account validation/verification process for the benefit of User B. In a further example, the SMS message from the application server may include a password or verification code required for accessing the particular application data services. User A could forward this message to User B, which User B could provide to the application in order to complete the validation/verification process.

Furthermore, not all mobile devices (e.g., the iPad tablet device from Apple Inc.) support SMS or MMS messaging technology, and hence, would preclude the use of any validation process that uses this technology.

SUMMARY

The teachings disclosed herein alleviate one or more of the above noted problems associated with conventional techniques by providing efficient network based methods and systems for automatically obtaining an operator assigned identifier associated with a mobile device of a user in a mobile communication network, for example, without exhausting network resources, reducing user performance, or requiring user interaction for this purpose. For example, an operator of the mobile communication network may use the technique for automatically obtaining the operator identifier associated with a mobile device user based on a data communication sent from a client application program at the mobile device through the mobile communication network. When the application does not have access to the operator assigned identifier (does not yet know, or mapping no longer valid) a first destination data communication address for the application server is used for the mobile device communication, where the network processes the first destination address to uniquely assign a source data communication address to the mobile device. The application server can then obtain the operator identifier of the device from the network, using the uniquely assigned source data communication address. The application (client and/or server) can then store the operator identifier for future use. When the application does have access to the operator assigned identifier, the client application uses a second destination address to communicate with the application server. The network processes the second destination address to assign a source data communication address to the mobile device that is shared by multiple mobile devices. In such an example, only the communication that enables acquisition of the operator identifier requires the one-to-one assignment of the address to the device. Other communications do not require such a resource or processing intensive operation.

In an exemplary method, for a mobile communication application at a mobile device of a user that does not yet have access to a network operator assigned identifier associated with a mobile device of a user, a data communication request is initiated from the client application through a mobile communication network of the operator to an associated application server, using a first destination data communication address assigned to the server. In response to the initiation of the data communication using this first destination address, the mobile device is assigned a unique source data communication address by the mobile communication network. The source data communication address is dedicated to the mobile device and used solely for purposes of obtaining the operator identifier. Further, in response to this initial data communication, a database of the mobile communication network is queried based on the uniquely assigned data communication address, to obtain the operator identifier for the mobile device of the user. The obtained operator identifier of the mobile device is stored in association with a device specific identifier associated with the mobile device, for access by the mobile communication application. The device specific identifier may be obtained during the initial data communication. Next, when the mobile communication application does have access to the operator identifier of the mobile device, a second data communication is initiated for the mobile device through the mobile communication network to the associated application server using a second destination data communication address, which is different from the first destination address and also assigned to the server.

In response to the second data communication using the second destination data communication address, the mobile communication network assigns a second data communication address to the mobile device of the user. This second data communication address is shared concurrently among a plurality of mobile devices communicating through the mobile communication network. As part of the second data communication, the device specific identifier is used to obtain the stored operator identifier of the mobile device, for further use in execution of the application.

The present subject matter also encompasses systems configured to implement a technique to automatically obtain an operator or billing identifier of a mobile device, like that outlined above, as well as programming to enable an application server to implement such a technique.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Introduction

Figure 1:
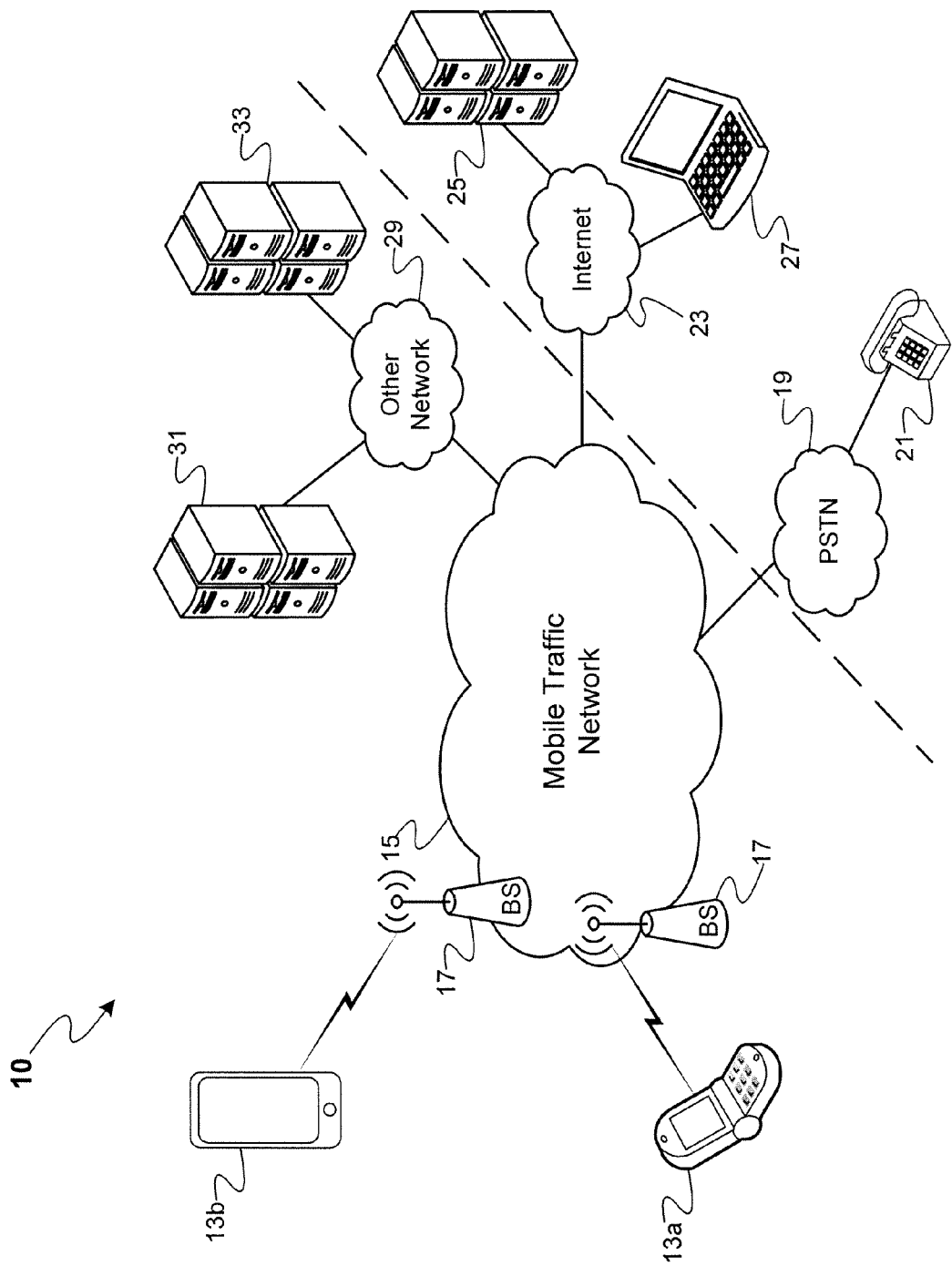
FIG. 1 illustrates a system offering a variety of mobile communication services, including communications for automatically obtaining an operator identifier associated with a mobile device of a user so as to provide advanced data services to the mobile device user.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to techniques and systems for enabling an operator of a mobile communication network, which also provides an application service from a network connected server, to automatically obtain an operator or billing identifier associated with a user of a mobile device based on network communications for the mobile device through the mobile communication network. For example, the network communications may be associated with one or more data services that are provided by an associated application server to the mobile device user via a client application program executing on the user's mobile device. In contrast to the aforementioned conventional techniques, the operator identifier associated with the particular user is automatically obtained without requiring any interaction from the mobile device user for this purpose. Furthermore, the teachings as described herein may be used even in scenarios in which a manufacturer of the mobile device or other developer of the device operating system has configured a client application program on the device to use a different identifier and not provide the operator's billing identifier in the communications with the associated application server.

As noted above, in contrast to aforementioned conventional techniques for obtaining operator identifier information, the teachings described herein provide an efficient network based way to obtain and utilize this information without limiting network resources or adversely impacting system performance. In several examples, an access request for advanced data services is sent from the user's mobile device via a client application program to an application server through a mobile communication network. Alternatively, a client application interface for such data services as provided by the application server initiates one or more data communication requests for automatically obtaining the operator identifier associated with the mobile device user. While several examples refer to the mobile directory number (MDN) as the operator or billing identifier, it is noted that these examples are presented for explanatory purposes and are not intended to limit the present disclosure thereto.

Reference now is made in detail to the examples illustrated in the accompanying drawings and discussed below. An exemplary general network system, which provides a variety of mobile communication services, is described initially with respect to FIG. 1. As will be described in further detail below, the network system illustrated in FIG. 1 can be used to provide communications for advanced data services in which an operator identifier associated with a mobile device user is automatically determined. Next, network elements and processes related to automatically obtaining the operator identifier for providing mobile application services to the mobile device user are described with respect to FIGS. 2-7.

The terms "operator" and "carrier" are used herein interchangeably to refer broadly and inclusively to any provider or supplier of mobile network communication services, including services for the transmission of real-time voice and data communication through a wireless or mobile communication network. An operator or carrier can be, for example and without limitation, a wireless service provider that provides services to mobile phone subscribers or a Voice-over Internet Protocol (VoIP) service provider that provides services to subscribers who use a personal computer or similar computing device to make and receive phone calls. VoIP is used herein to refer broadly to the digital transmission of real-time voice communications over Internet Protocol (IP) networks such as the Internet or similar networks.

Additionally, the terms "data services" and "advanced data services" are used herein interchangeably to refer broadly and inclusively to services for the communication of data and any functionality as provided by the network operator/carrier for mobile device users/subscribers through the mobile communication network.

General Network System

FIG. 1 illustrates an exemplary distributed network system 10 for providing mobile communication and information services to one or more clients. For example, system 10 can be used to exchange communications between client applications and application servers related to one or more data services provided by the carrier to the client applications. Such data services include any services requiring an operator identifier associated with a mobile device user or user account (e.g., subscription-based content delivery services, as previously noted). However, a person skilled in the relevant art given this description would appreciate that system 10 can be used to provide any one of various well-known communications services for many other mobile devices, stations or users that may not necessarily require access to user or device specific information for the carrier or mobile device network operator.

As previously noted, such advanced data services include subscription based services that enable the mobile device user to purchase premium content (e.g., multimedia content, including streaming video) as offered by the operator of the mobile communication network directly from the device, e.g., either mobile device 13a or mobile device 13b in this example. As will be described in further detail below, this functionality may be provided to the user via a mobile communication application or client application program (or simply "client") that is executed on the mobile device of the user. A person skilled in the relevant art given this description would appreciate that such client application can be any type of communication application, interface, or process executable on the mobile device and configured for enabling data communications with an associated application server through the mobile communication network. For example, the client application may be implemented as a web interface for an associated application server. Alternatively, the client application may be a dedicated application program that is installed and executed on the user's device specifically for enabling the user to access the functionality provided by a particular data service.

In the example shown in FIG. 1, two mobile client devices or mobile devices 13a and 13b are configured to communicate over a mobile communication network 15. These devices may be referred to as mobile stations for users in the mobile communication network. Mobile devices 13a and 13b are examples of mobile devices (or mobile stations) that enable a user of such devices to access or purchase advanced data services provided by the wireless network operator or carrier. Mobile devices 13a and 13b can be any type of mobile computing device capable of communications over one or more networks. Examples of such mobile computing devices include, but are not limited to, portable handsets, smartphones, tablet computers, and personal digital assistants.

Any enhanced data services provided by the carrier or network operator via a client application executed on the mobile device of a user may be delivered to a smart-mobile device such as a smart mobile phone or tablet computing device having, for example, a touch-screen display for user input. Similarly, such data services may be delivered to other types of mobile devices as well including, for example, mobile devices that do not have a touch-screen display but are capable of executing client applications for purposes of delivering advanced functionality and data services from the carrier to users. Hence, in the simplified example shown in FIG. 1, mobile device 13a is a mobile device that does not have a touch-screen display and mobile station 13b is a smart mobile device having a touch-screen display for user input (e.g., iPhone from Apple Inc.). As would be apparent to a person skilled in the art given this description, implementation of advanced functionality such as on-line data services generally will involve at least some execution of software programming in the mobile devices in addition to various user input/output functions and data communications through the network 15, from the mobile devices.

Client program applications can be configured to execute on many different types and configurations of mobile devices 13a and 13b. Furthermore, such a client application includes an application program or interface executable on a user's mobile device, which facilitates the delivery of data services to the user's device. For example, the client application can enable mobile device users to access or purchase advanced data services provided by the carrier. A person skilled in the relevant art given this description would appreciate that the client application executing on mobile devices 13a or 13b may be written in any one of various well-known programming languages. For example, the client application can be written to execute on a binary runtime environment for mobile (BREW-based) mobile device, a Windows Mobile based mobile device, Android, I-Phone, Java Mobile, or RIM based mobile device such as a BlackBerry or the like.

As will be described in further detail below, the client application can send a request to one or more servers (e.g., server 25) over network 15 (and any other interconnected networks) for access to the user-requested service provided by the carrier. Accordingly, mobile device 13a and/or mobile device 13b are configured to communicate over the air with a base station 17 and through the traffic network 15 for various voice and data communications, e.g. through the Internet 23 with a server 25 and/or with application servers 31.

If the mobile service carrier offers a specialized data service to mobile device subscribers or users (e.g., via a client application executed on the users' respective mobile device), the service may be hosted on a carrier operated application server 31, for communication via the networks 15 and 29. Alternatively, such data service may be provided by a separate entity (alone or through agreements with the carrier), in which case, the service may be hosted on an application server such as server 25 connected for communication via the networks 15 and 23. Servers such as 25 and 31 may provide any of a variety of common application or service functions in support of or in addition to an application program running on the mobile device 13. However, for purposes of further discussion, we will focus on functions thereof in support of mobile data services requiring the operator identifier associated with a mobile user or carrier-specific account associated with that user. For any given service provided by the carrier to its users, an application program within the mobile device may be considered as a "client" and the programming at 25 or 31 may be considered as the "server" or "application server" application for the particular service. However, it should be noted that the server or application server may comprise multiple servers as may be necessary to perform the desired functionality for the particular service provided by the carrier.

In this example, network 15 provides mobile wireless communications services to those mobile devices as well as to other mobile devices (not shown), for example, via a number of base stations (BSs) 17. The present techniques in accordance with the teachings described herein may be implemented in any of a variety of available mobile networks 15 or on any type of mobile device compatible with such a network 15. As such, it should be noted that the illustration in FIG. 1 depicts only a simplified example of a few relevant elements of the system 10 and the network 15 for ease of explanation and purposes of discussion herein.

For example, the wireless mobile communication network 15 may be implemented as a network conforming to one or more well-known wireless networking standards and protocols. Examples of such standards include, but are not limited to, the code division multiple access (CDMA) IS-95 standard, the 3rd Generation Partnership Project (3GPP) wireless IP network standard, the 3rd Generation Partnership Project 2 (3GPP2) wireless IP network standard, the Evolution Data Optimized (EVDO) standard, the Global System for Mobile (GSM) communication standard, the time division multiple access (TDMA) standard or other standards used for public mobile wireless communications.

Network 15 of system 10, as shown in FIG. 1, is configured to enable users at mobile devices 13a and 13b to subscribe to one or more types of the aforementioned data services offered through the mobile communication network of the operator or wireless carrier. Furthermore, mobile devices 13a and 13b enable such users to initiate voice telephone communications in addition to more advanced data services (e.g., services related to the delivery premium data content and services such as streaming video) through the network 15. Accordingly, mobile devices 13a and 13b are configured to process and handle data communications in accordance with the particular type of network communication standard or configuration associated with network 15. In an example, network 15 allows users of the mobile devices such as 13*a* and 13*b* (and other mobile devices not shown) to initiate and receive telephone calls to each other as well as through the public switched telephone network or "PSTN" 19 and telephone stations 21 connected to the PSTN. Additionally, network 15 enables users to request various data services via the Internet 23, such as downloads, web browsing, email, and other similar types of web services. Such data services are hosted at one or more application servers associated with the network 15.

In the example illustrated in FIG. 1, system 10 further includes a computer device 27 for a user that is communicatively coupled to a server 25 over Internet 23. Computer device 27 is any general-purpose or special-purpose computing device capable of executing one or more client applications and exchanging data communications to server 25 or other servers over one or more networks. Examples of such computing devices include, but are not limited to, desktop computers, laptop or notebook computers, and tablet computers. Such networks include interconnected networks, as shown by networks 15, 19, 23 and 29 in the example system of FIG. 1. Such interconnected networks can include, for example and without limitation, local area networks, wide area networks, intranets, and the Internet.

As the mobile communication network of system 10 can be implemented using a number of interconnected networks, the overall network for system 10 may include a number of radio access networks (RANs). The overall network may additionally include regional ground networks interconnecting a number of RANs and a wide area network (WAN) interconnecting the regional ground networks to core network elements. A regional portion of the network(s) of system 10, such as that serving application data to each of mobile devices 13*a* and 13*b*, can include one or more RANs. In addition, the network(s) can include a regional circuit and/or packet switched network including any associated signaling network facilities.

Physical elements of a RAN operated by one of the mobile service providers or carriers, include a number of base stations represented in the example by the base stations (BSs) 17. Although not separately shown in FIG. 1, such a base station 17 can include a base transceiver system (BTS), which can communicate via an antennae system at the site of base station and over the airlink with one or more of the mobile devices 13, when the mobile devices are within range. Each base station can include a BTS coupled to several antennae mounted on a radio tower within a coverage area often referred to as a "cell." The BTS is the part of the radio network that sends and receives RF signals to/from the mobile devices 13 that are served by the base station 17.

The radio access networks can also include a traffic network represented generally by the cloud at 15, which carries the user communications and data for the mobile devices 13 between the base stations 17 and other elements with or through which the mobile devices communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood by a person skilled in the relevant art given this description that the various network elements can communicate with each other and other aspects of the mobile communications network in system 10 and other networks (e.g., the public switched telephone network (PSTN) and the Internet) either directly or indirectly.

The carrier will also operate a number of systems that provide ancillary functions in support of the communications services and/or application services provided through the networks of system 10. Further, elements of these systems are configured to communicate with other nodes or elements of the networks in system 10 via one or more private IP type packet data networks 29 (also referred to as an "intranet"), i.e., a private networks. Generally, such systems are connected to enable communication via the private network 29. A person skilled in the art, however, would recognize that systems outside of the private network could serve the same functions as well. Furthermore, these systems can be operated by the network service provider as part of the overall network in system 10. Examples of systems that communicate via the intranet type network 29, as shown in FIG. 1, include one or more application servers 31 and a related authentication server 33 for the application service of server 31. It would be apparent to a person skilled in the relevant art that the systems in FIG. 1 are described for explanatory purposes and that the techniques described herein are not intended to be limited thereto.

In the example shown in FIG. 1, to ensure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile device 13*a* or 13*b*, the server application provides appropriate information to the authentication server 33 to allow server application 33 to authenticate the mobile device 13*a* or 13*b* as outlined herein. Upon successful authentication, the server 33 informs the server application 31, which in turn provides access to the service via data communication through the various communication elements (e.g. 29, 15 and 17) of the network 10. A similar authentication function may be provided for carrier service(s) offered via the server 25, either by the server 33 if there is an appropriate arrangement between the carrier and the operator of server 24, by a program on the server 25 or via a separate authentication server (not shown) connected to the Internet 23.

It should be noted that the above noted authentication functions performed by server 33 is separate from the functions performed by application server (e.g., server 31) for automatically obtaining the operator or billing identifier information associated with either mobile device 13*a* or 13*b* for purposes of billing or charging the user of the mobile device, as will be described in further detail below with respect to FIG. 2. However, a person skilled in the relevant art would appreciate that both sets of functions may be performed by the same server in the mobile communication network depending on the particular implementation of the particular communication network.

Example System for Automatic Retrieval of Operator Identifier

Figure 2:
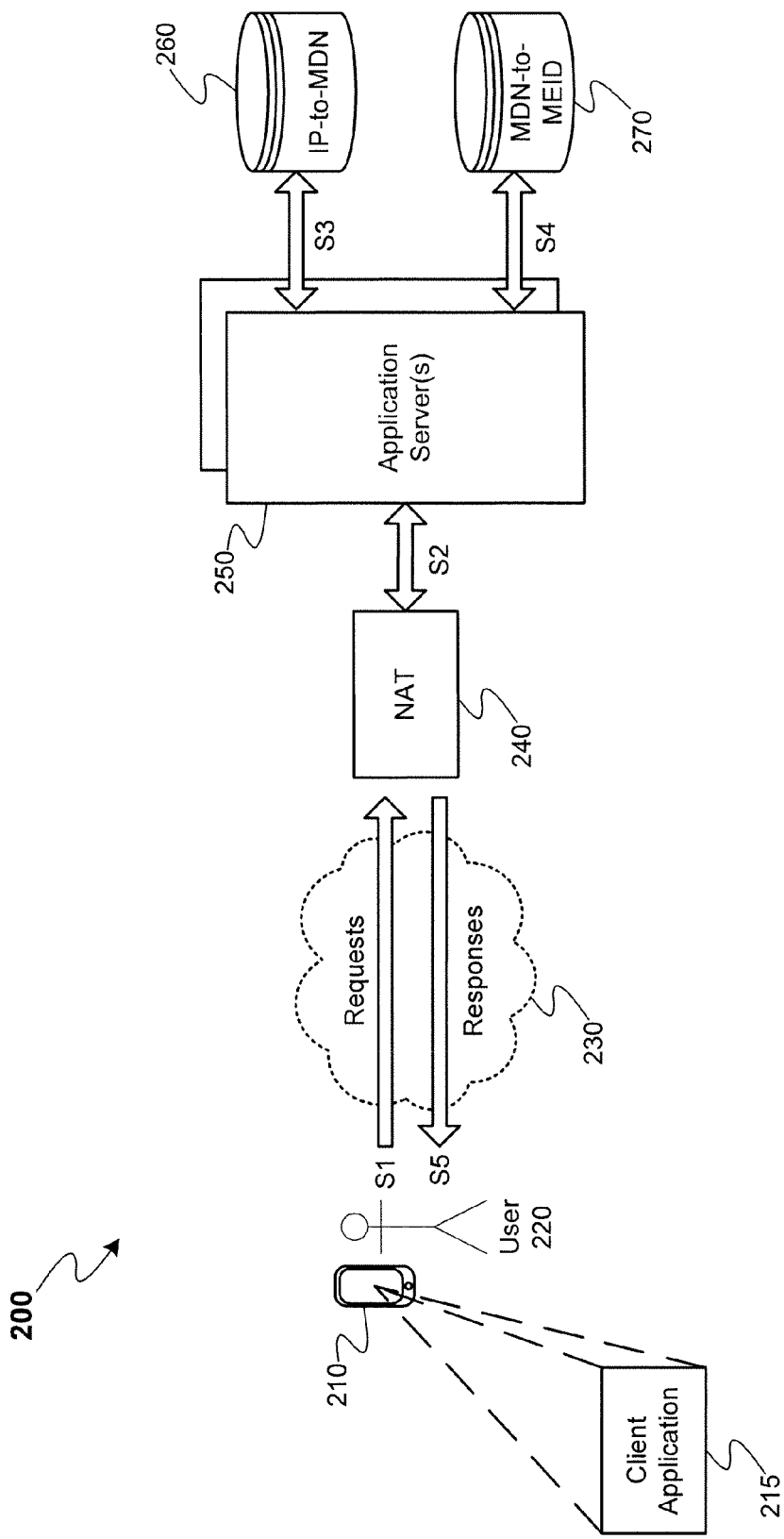
FIG. 2 is a block diagram illustrating an exemplary system for automatically obtaining an operator identifier associated with a mobile device user so as to provide advanced data services via a client application executing on the user's mobile device.

FIG. 2 is a block diagram illustrating an exemplary data communication system 200 for automatically obtaining an operator or billing identifier associated with a mobile device of a user or subscriber based on data communications from a mobile communication application program executed at the mobile device. In this example, a mobile communication application (or "client application" or simply "client") sends data communication requests through a mobile communication network to an associated application server for purposes of requesting access to various data services provided by the operator of the mobile communication network. As previously noted, the operator of the mobile communication network must obtain the operator or billing identifier associated with the mobile device of the user in order to bill the user (or the mobile user's account) for the data services provided or used.

For purposes of discussion, system 200 will be described with reference to one or more of the components in system 100 of FIG. 1, as described above, but it is not intended that system 200 be limited thereto. As shown by the example illustrated in FIG. 2, system 200 includes a mobile device 210 of a user 220. Mobile device 210 executes a client application 215, which is associated with one or more application servers 250 over a network 230. For example, mobile device 210 may be implemented using either mobile device 13a or mobile device 13b in system 10 of FIG. 1, as described above. Client application 215 can be any mobile communication application program, as previously described, which is executable at mobile device 210 and configured to communicate with application server(s) 250 through network 230. For example, client application 215 can transmit data communication requests to application server 250 through a mobile communication network 230 for purposes of accessing various types of advanced data services, provided by an operator of mobile communication network 230. Such data services may, for example, be hosted at application server(s) 250 and accessed by user 220 directly from device 210 using an interface provided by client application 215.

Network 230 can be any network or combination of networks in an overall mobile communication network for transmitting data communications between various devices associated with the mobile communication network 230. Network 230 can include, but is not limited to, a wired (e.g., Ethernet) or a wireless (e.g., Wi-Fi or 3G) network. In addition, network 230 can include, but is not limited to, a local area network, medium area network, and/or wide area network such as the Internet. Network 230 can support protocols and technology including, but not limited to, Internet or World Wide Web protocols and communication services. Referring back to FIG. 1, network 230 may be implemented using, for example, a combination of networks 15, 29, 23 and 29 of system 10, as described above. Intermediate network routers, gateways, or servers may be provided between components of communication system 200 depending upon a particular application or environment.

As noted above, mobile device user 220 may access the data services provided by the operator, for example, by subscribing or purchasing digital content or services using client application 215 via a graphical user interface presented to user 220 via a touch screen display of mobile device 210. Accordingly, client application 215 is configured to send one or more data communication requests (S1) for establishing a data connection with application server 250 and accessing the user-subscribed services through network 230.

More importantly, for this example, client application 215 is configured to access application server 250 using at least two different destination data communication addresses assigned to application server 250. For example, both destination addresses may be public IP addresses associated with the requested data service or application server 250, which provides data communications associated with the service through mobile communication network 230. Further, these destination data communication addresses may be either actual IP addresses or domain names that the client resolves to actual IP addresses, for example, by using a domain name system (DNS) server.

However, one of the destination data communication addresses in particular is configured in mobile communication network 230 so as to cause network 230 to assign a unique data communication address to device 210 for purposes of obtaining the operator identifier associated with mobile device 210. The destination data communication address is considered "dedicated" for this purpose due to its configuration in mobile communication network 230. Specifically, any flow of data communication directed to the particular destination data communication address is assigned a unique source data communication address. For example, the unique source data communication address may be a unique source public IP address. Alternatively, the unique source data communication address may include a combination of a unique source IP address and a unique port number, where both the source IP address and source port assigned to mobile device 210 are tracked in mobile communication network 230. The source data communication address in this example is considered "unique" for this purpose as it remains assigned to device 210 until a valid operator identifier associated with device 210 has been obtained. For example, a one-to-one network address translation (NAT) mapping scheme between a source private IP address of the network operator's private network and the unique source public IP address can be used to effect such a unique or dedicated source data communication address.

The other destination data communication address(es) assigned to application server 250 are configured in mobile communication network 230 so that a shared destination data communication address be assigned to device 210. The shared destination data communication address can be used by client application 215 for sending general access requests to application server 250, for example, when it is determined that the client application 215 has access to a valid operator ID for any subsequent access requests. Specifically, any flow of data communication directed to the destination data communication address(es) for general communication access is assigned a shared source data communication address (e.g., a source public IP address assigned to more than one device). For example, a one-to-many NAT mapping scheme between the source private IP address and a shared source public IP address can be used to effect such a shared source data communication address. In this example, the source public IP address can be shared concurrently among the mobile device and a plurality of other mobile devices communicating through mobile communication network 230.

A person skilled in the relevant art would appreciate that such a dedicated or unique destination data communication address may be specified in mobile communication network 230 in any number of ways depending on, for example, the implementation details associated with the particular network. In an example, client application 215 is configured by default to use the dedicated destination data communication address as an initial destination address for a new data communication with the associated application server (e.g., server 250, in our example). For example, this dedicated destination address may be hard-coded in client application 215 itself or stored as an application file at device 210, located in a memory of device 210 that is accessible to client application 215. Upon obtaining the operator identifier for device 210, application server 250 indicates in its response to client application 215 that a valid operator identifier has been obtained and/or stored for later use (e.g., at the server or client) (S5).

Upon receiving such an indication or notification from server 250, client application 215 is configured to use the other destination address for subsequent data communication requests, for example, in general data communication access requests to application server 250. Like the dedicated address, the other destination address may be hard-coded in client application 215 or stored at device 210. Alternatively, this destination address may be provided to client application 215 by server 250, e.g., as a second destination IP address to use once the operator identifier has been obtained. For example, the address may be reset or reinitialized to the dedicated destination address if application server 250 sends a response to client application 215 indicating that the stored operator identifier is no longer valid, thereby initiating a new request from the client using the initial, default dedicated destination address. This can occur if, for example, mobile communication service for the mobile device (and/or mobile device user) that is associated with the previously obtained/stored operator identifier (e.g., MDN) has been suspended or deactivated. This can also occur if, for example, the operator identifier associated with the mobile device has been modified (e.g., the MDN for the user has changed to a different number).

In a different example, application server 250 (or NAT 240) designates a portion of its available destination data communication address space to form a set or pool of dedicated destination addresses out of which particular dedicated destination addresses are sent to particular mobile client application programs when the operator identifier must be retrieved from communication network 230 or reset upon discovering that a stored identifier is no longer valid.

A person skilled in the art given this description would appreciate that the particular implementation may vary from one operator's mobile communication network to another, and that the functionality as described herein is not limited to any particular implementation or designation for determining the destination or source data communication addresses to be used. For example, it would be apparent to a person skilled in the relevant art given this description that an operator may use one of several different approaches for obtaining the operator identifier associated with a mobile device that do not involve having to assign a unique source data communication address to the device, as described above. However, it would also be apparent that such approaches may be technically feasible, but potentially more complex for the operator to implement in the mobile communication network. In one example of such an approach, the mobile communication network is configured to track both the source data communication address in addition to the source data communication port assigned to the mobile device. The ability to also track the communication port for the device would remove the requirement of assigning a unique source communication address to the device for obtaining the operator identifier, for example, by enabling the use of various port forwarding or translation schemes in the network.

In order to implement the above described NAT schemes, system 200 further includes a NAT device 240 for intercepting data communication requests from client application 215 that are directed to application server 250 based on one of the destination data communication addresses assigned to server 250. As shown in FIG. 2, NAT 240 is communicatively coupled to application server 250 via, for example, a data connection (S2) for facilitating data communication between application server 250 and client application 215 through mobile communication network 230. For example, NAT 240 may be implemented as a router or dedicated server, which is configured to receive network data communication (e.g., in the form of IP data packets) and also, modify the network address information associated with such data communication (e.g., IP address information in IP data packet headers). Furthermore, NAT 240 is configured to implement various network communication schemes, including different network address or port translation schemes for translating or mapping public network address and/or port information to one or more private network addresses associated with the private network of the operator/carrier. In a further example, NAT 240 may be integrated with or implemented as a component of application server 250 for providing the same type of functionality for the same purpose. Furthermore, application server 250 can be configured to detect any data communication requests from client application 215 directed to the destination data communication addresses directly or alternatively, based on communications from NAT 240.

In an example, client application 215 is assigned a unique source data communication address, as described previously, in response to a data communication request from client application 215 that is directed through mobile communication network 230 to the dedicated destination data communication address assigned to application server 250. In this example, client application 215 is configured to use the dedicated destination address when it is determined that a valid operator identifier associated with mobile device 210 is not accessible or available for use. Client application 215 is thus configured to use the dedicated network address solely for purposes of obtaining a valid operator identifier when it is determined that either client application 215 does not have access to a valid operator identifier for providing the requested data services for user 220. Alternatively, client application 215 is configured to use the shared network address for general communication with the server 250 or when it is determined that client application 215 has access to a valid identifier or the identifier is available for use.

When client application 215 transmits data communication or access requests using the dedicated destination address, application server 250 (e.g., via NAT 240) tracks the source data communication address currently assigned to mobile device 210 and retrieves the corresponding operator identifier. In an example, application server 250 tracks both the source port number assigned to device 210 in addition to the source communication address. In general, the network operator maintains a database (e.g., database 260) comprising a mapping of operator identifiers (e.g., MDNs) to source data communication addresses (e.g., source IP addresses and optionally, source ports) assigned to each mobile device in the mobile communication network 230. Therefore, in our example, application server 250 can query database 260 for retrieving the operator identifier associated with mobile device 210 based on the source data communication address (S3).

Upon retrieving the operator identifier from database 260, application server 250 queries another database 270, which maintains a mapping between the operator identifier and a device specific identifier associated with mobile device 210 (S4).

As referred to herein, the term "device specific identifier" refers one or more identifiers specific to the mobile device. For example, the device specific identifier for mobile device 210 may be a unique identifier assigned by the manufacturer or operating system developer or provider. Further, the device specific identifier includes a mobile equipment identifier and/or a unique device identifier. Examples of different types of mobile equipment identifiers that can be used include the mobile equipment identifier (MEID) and the International Mobile Equipment Identity (IMEI) number. Application server 250 can then store the operator identifier (e.g., MDN), mobile equipment identifier (e.g., MEID) and any other unique device identifier information associated with mobile device 210. A specific example of another type of device specific identifier is the unique device identifier (UDID) associated with some versions of the iOS operating system from Apple Inc. For example, the UDID or other unique identifier associated with a particular mobile device may be included in the communication request from client application 215 to application server 250, assuming this information is accessible to client application 215. Based on the foregoing, the examples described herein may refer to either the mobile equipment identifier or the unique device identifier, or to both inclusively. A person skilled in the relevant art given this description would appreciate that these examples and techniques described herein are not limited to using only one device specific identifier.

The identifier information associated with mobile device 210 can be stored at application server 250 or at mobile device 210, including any storage device that may be coupled to each. The stored information associated with mobile device 210 is used for subsequent communication requests from client application 215 through network 230 to application server 250. As noted above, since client application 215 has access to a valid operator identifier, subsequent requests from client application 215 can be directed to application server 250 via network 230 by using the non-dedicated or shared destination network address associated with application server 250.

For subsequent requests directed to the shared destination network address, application server 250 retrieves the operator identifier (e.g., MDN), mobile equipment identifier (e.g., MEID) and other unique device identifier information (e.g., UDID) previously stored for mobile device 210. Applications server 250 can retrieve this information either from a local storage device or a carrier database (not shown) that is accessible to server 250 or from mobile device 210 via client application 215, depending on the storage location of this information. A person skilled in the relevant art given this description would appreciate that the particular location (i.e., either the server or client) for storing the operator and mobile equipment and/or unique device identifier(s) may be selected based on one or more operational factors or considerations that may be particular to the mobile communication network 230 implementation or type of mobile device executing or hosting client application 215.

Examples of such factors include, but are not limited to, computing performance, network efficiency, memory or storage availability, information security and user experience. For example, storing the operator and mobile equipment identifiers along with any additional device identifier information at the mobile device may increase the performance of the client application since the client can quickly obtain the necessary information locally and include it directly within the initial communication request to application server 250. This may be advantageous for the performance of application server 250 as well if, for example, application server 250 would have need to query a remote database in order to retrieve the necessary information, which likely would take a greater amount of time than locally accessing the information. Any increase in performance or efficiency would also improve user experience as the requested data services would be provided faster to the user's mobile device. Conversely, however, storing the information solely at the client may be less secure as it would be more susceptible to unauthorized modification or use.

As previously discussed, the operator identifier and additional identifier information associated with mobile device 210 may be stored locally at device 210 (e.g., in a flash storage device integrated within or communicatively coupled to device 210) or alternatively, at application server 250 (e.g., in a file stored in a memory device of server 250 or in an external data store coupled to the server). It is noted that application server 250 may use any number of well-known techniques to notify client application 215 when a stored operator identifier (either at the client or at the server) is no longer valid. For example, client application 215 may use an internal flag, e.g., implemented as a Boolean operator that can be toggled between two different values, signifying whether the stored identifier information is still valid. Further, application server 250 may send a notification in a data communication response to client application 215 when application server 250 determines that this information is no longer valid or active in the mobile communication network 230. Such a notification may direct client application 215 to reset or reinitialize the stored operator ID, for example, by initiating a new communication request using the dedicated destination data communication address from the client through the communication network 230 to the application server 250. Application server 250 can thereby specify the particular destination data communication address (e.g., either the dedicated destination address used for the purpose of obtaining the operator identifier associated with mobile device 210 or the destination address used for general communication with application server 250) for client application 215 to use in any subsequent data communication requests.

In another example, if the operator identifier information is stored at the client device 210, then application server 250 analyzes the information to determine whether it is still valid. For example, application server 250 checks the operator identifier and mobile equipment identifier or unique device identifier received from client application 215 against the information stored in carrier database 270. As carrier database 270 is updated automatically by the mobile network operator whenever a change is made to the operator identifier (e.g., the user is assigned a new mobile directory number), application server 250 is able to periodically verify that the stored information is still accurate before providing any data services to client application 215.

Additional examples and description related to the operations of client application 215 and application server 250 are provided below with respect to the exemplary methods illustrated in FIG. 3 and FIG. 4, respectively.

Example Client Process

Figure 3:
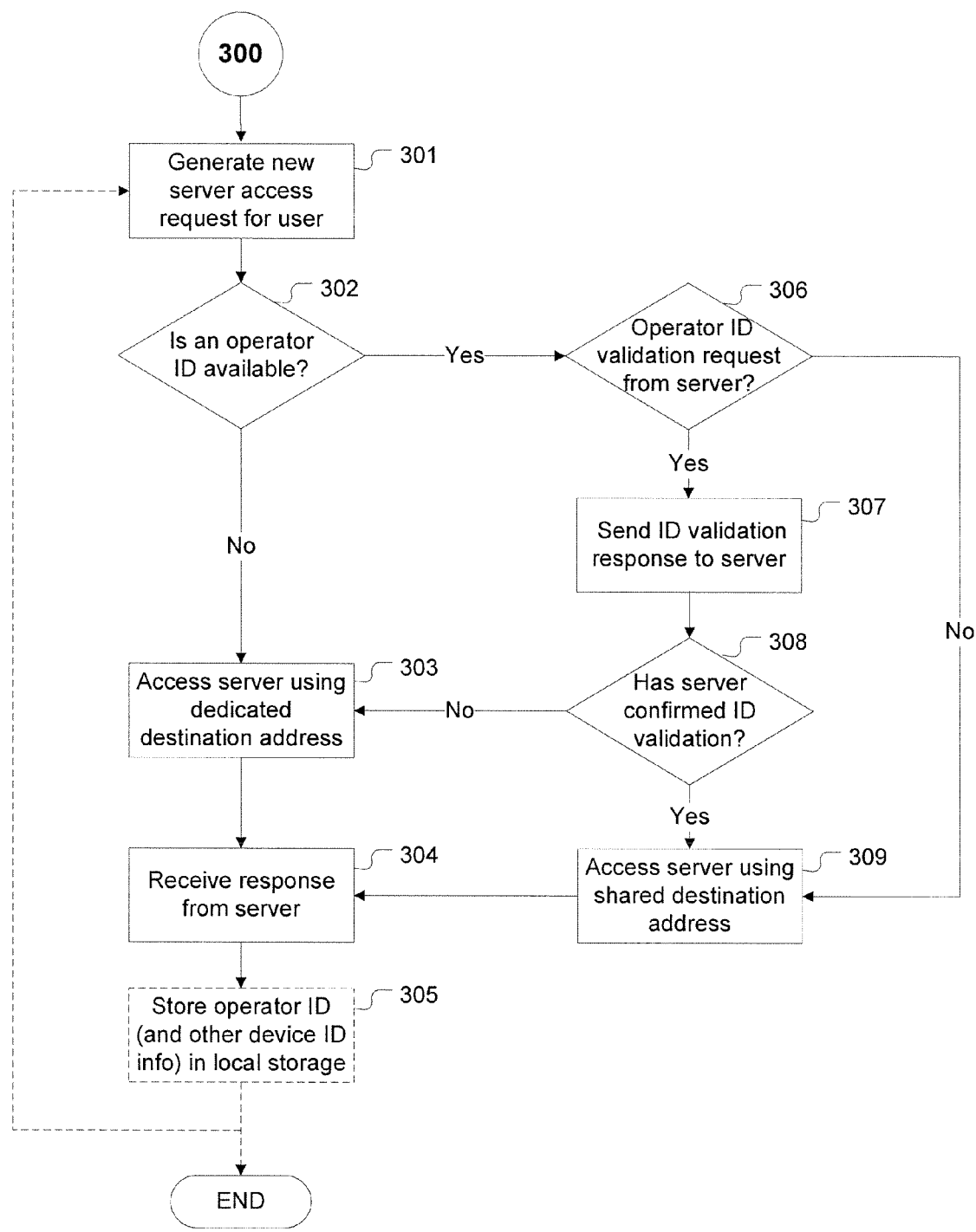
FIG. 3 is a flowchart of an exemplary client process for automatically obtaining an operator identifier of a mobile device user in order to access advanced data services provided by an operator of a mobile communication network.

FIG. 3 is a flowchart of an exemplary method 300 of a client for automatically obtaining an operator identifier associated with a mobile device in order to access advanced data services provided by an operator of a mobile communications network. For ease of explanation, system 200 of FIG. 2, as described above, will be used to describe method 300, but neither system 200 nor method 300 is intended to be limited thereto. Method 300 will be described in the context of a client application program (e.g., client application 215 of system 200) executed on a mobile device (e.g., mobile device 210 of system 200) of a user. The mobile device is communicatively coupled to an application server (e.g., application server 250) via a mobile communication network (e.g., network 230 of system 200). Steps 301-309 of method 300 can be performed by, for example, client application 215 of system 200, as described above. Based on the description herein, a person of ordinary skill in the relevant art will recognize that method 300 can be executed on other types of client devices such as, for example and without limitation, a PDA, a laptop or personal computer, and similar types of devices capable of executing a client application interface for providing a user with advanced data communication services requiring an operator identifier from an application server through a communication network.

Method 300 begins in step 301, which includes generating a new data communication access request directed to the application server so as to initiate the delivery of advanced data services for the user at the mobile device. In an example, the client generates an initial request to be sent to the application server in order to establish a network data connection with the server. For example, the initial request may be generated in response to input from the user (e.g., via a graphical user interface provided by the client application) at the mobile device. Alternatively, as described above, the application server may initiate the client to send the request, e.g., when it is determined by the server that a stored operator identifier is no longer valid or that the associated device identifier has become inactive. In step 302, the client determines whether a valid operator ID is available or accessible for use in execution of the application program at the mobile device. As previously discussed, the operator identifier (ID), necessary for providing the advanced data services (e.g., subscription based service that requires billing the user) as requested from the application server can be stored at either the client or the server. In an example, if the operator ID, including the associated device ID, is stored at the mobile device, the client can access this stored information and include it in the request sent to the application server.

As will be described in further detail below with respect to FIG. 3, the application server determines whether the client has access to the operator ID based on the access request from the client, and more specifically, based on the destination network communication address to which the request was directed. If the client does not have access to a valid operator ID, method 300 proceeds to step 303, in which the request for server access is directed to a destination network data communication address that is dedicated for purposes of retrieving a valid operator ID, as previously described in reference to system 200 of FIG. 2.

Accordingly, the application server tracks the destination data communication address in order to determine whether a valid operator identifier needs to be obtained before providing the appropriate response to the client. Method 300 thus proceeds to step 304 in which a response is received from the server. If the operator ID and associated information retrieved by the application server are to be stored at the mobile device for subsequent requests for the client, the response from the server may include the operator ID and device ID information. Therefore, method 300 includes the optional step 305, which includes storing the ID information received from the server in a local storage device that is accessible to the mobile device for later use in subsequent server access requests. Method 300 can then return to step 301 to generate subsequent data communication requests for server access, in which case the steps of method 300 are repeated. Alternatively, method 300 can conclude after step 304 or optional step 305 (when performed), if additional server access requests are unnecessary.

Referring back to step 303, if the operator ID is stored at the client device, method 300 proceeds to steps 306, which includes determining whether the application server has sent a request to the client for validating the ID information stored at the device. Steps 306-309 of method 300 thus correspond to cases in which the operator and device ID information are stored at the client device. The application server can additionally validate the stored information using any number of well-known validation techniques. In one example of such a validation technique, the application server generates a random string and includes the generated string in a push message to the device. A person skilled in the relevant art given this description would appreciate that the random string may be generated using any number of well-known techniques. For example, the random string may be based on a known unique identifier associated with the mobile device that is separate from the unique device ID (e.g., MEID), referred to previously. Further, such unique identifier may be generated using a hash algorithm, e.g., an MD5 Message-Digest cryptographic hash algorithm.

As shown in step 307 of method 300, the client application would then be required to return the random string along with operator ID and device ID associated with the device to complete the validation. This would help mitigate the potential for fraud, including cases where the same valid operator-to-device ID mapping is distributed and shared amongst several users of different mobile devices.

Example Server Process

Figure 4:
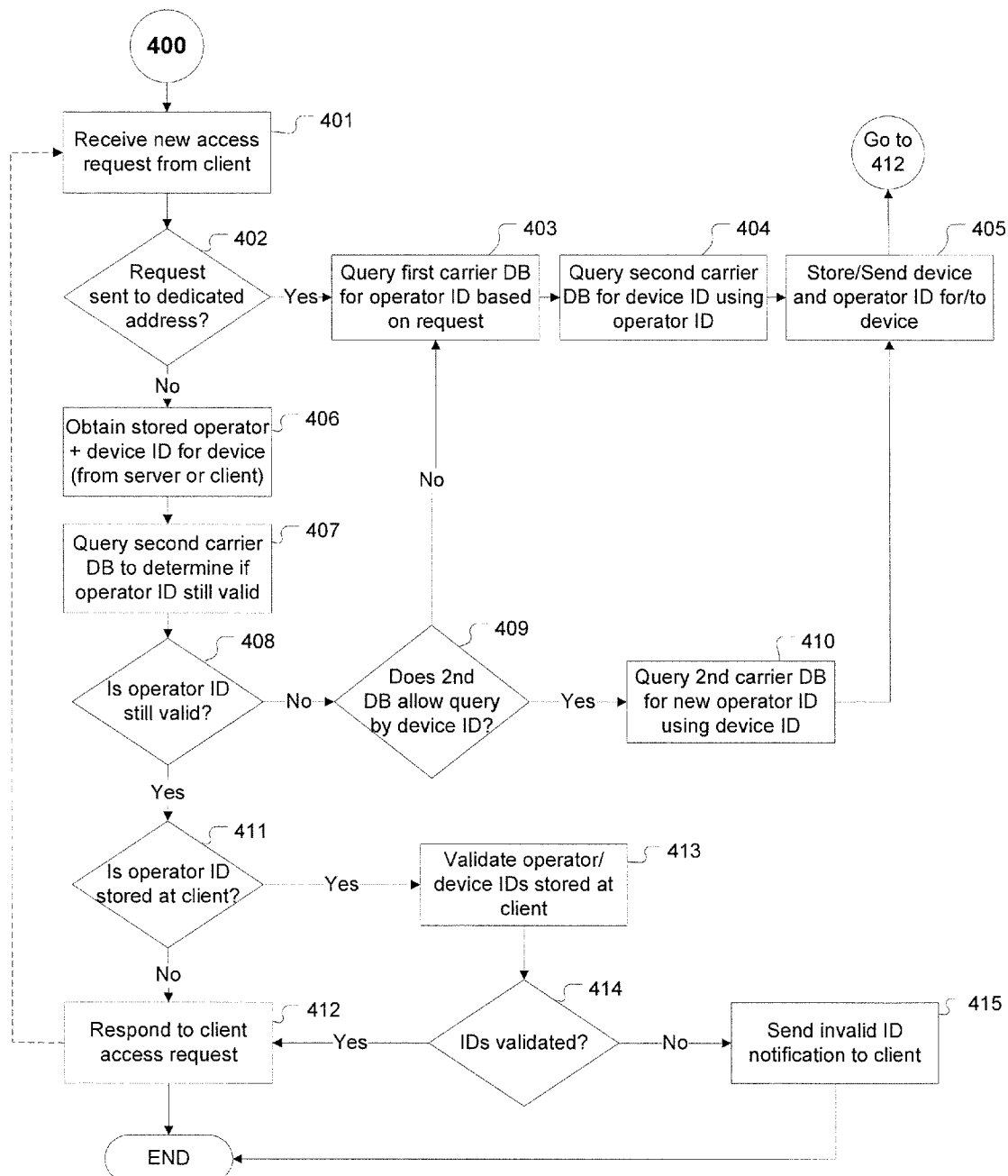
FIG. 4 is a flowchart of an exemplary server process for automatically obtaining an operator identifier of a mobile device user in order to deliver advanced data services provided by an operator of a mobile communication network.

FIG. 4 is a process flowchart of an exemplary method 400 of a server for automatically obtaining an operator identifier of a mobile device user for advanced data services provided by an operator of a mobile communications network. Like method 300, for ease of explanation, system 200 of FIG. 2, as described above, will be used to describe method 400, but is not intended to be limited thereto. Thus, for example, steps 401-415 of method 400 can be performed by application server 250 of system 200, as described above, including any devices or elements of the mobile communication network as necessary such as a NAT server or router (e.g., NAT device 240) and one or more carrier databases (e.g., databases 260 and 270). Unlike method 300, however, method 400 will be described in the context of an application server (e.g., application server 250 of system 200) associated with a mobile communication or client application program (e.g., client application 215 of system 200) for providing advanced data services to a user of a mobile device (e.g., device 210 of system 200) through the mobile communication network.

Method 400 begins in step 401, which includes receiving a new access request for data communications through the mobile communication network from the client application program (e.g., client application 215) on a mobile device of a user. As previously noted, this request may be directed by the client application to either a dedicated destination data communication address or one of several shared destination data communication addresses, all of which are assigned to the associated application server. In step 402, a determination is made as to whether the mobile client application has access to an operator identifier associated with the mobile device. As noted above, the application server in this example makes the determination based on the destination data communication address (e.g., destination IP address) to which the request was directed. Also as noted above, the client application program may access the application server using at least two separate destination addresses: a specific destination address dedicated in the mobile communication network solely for obtaining the operator identifier and at least one other shared destination address for general access to the application server. In the mobile communication network of the operator, the dedicated destination address is configured such that any flow of data communication directed to the particular destination address is assigned a unique source network communication address, as described above. For example, a one-to-one NAT mapping scheme may be used in place of the default manyto-one NAT mapping when it is determined that the operator identifier needs to be retrieved.

Upon determining the client does not have access to a valid operator identifier based on the access request, method 400 proceeds to steps 403-405 for obtaining a valid operator identifier. For example, such a determination may be made when this particular client has never previously established a data connection with the application server or when the client attempts to establish a data connection after the application server has determined that the stored operator identifier (e.g., either at the client or server, as noted above) is no longer valid (e.g., a modification has been subsequently made to the operator identifier).

In step 403, the operator identifier (e.g., MDN) is obtained by querying a database of the operator/carrier in the mobile communication network (e.g., database 260 in system 200 of FIG. 2, as described above). This database is queried using the source communication network address (e.g., source IP address and optionally, the source port number) associated with the mobile device, which is derived from the received access request from the client. As noted above, this database includes a mapping between source communication addresses associated with the mobile devices that are known to the mobile communication network and their respective operator identifiers. The mapping of source communication address to operator identifier associated with each device is generally maintained by the network operator/carrier and may be updated, for example, when the mobile device tries to establish a data connection for exchanging data communications with other devices through the mobile communication network, including any devices that are external to the communication network. In addition, for any subsequent changes to the operator identifier, the information stored in the carrier database is updated accordingly. For example, the operator identifier may need to be updated if the mobile telephone number for the user has been modified or reassigned to a different user. In general, such modifications are made by other components or elements in the mobile communication network, which generally are separate or distinct from the application server itself.

Upon retrieving the operator identifier from the first carrier database in step 403, method 403 proceeds to step 404, which includes querying a second carrier database to obtain a device identifier (e.g., MEID) associated with the mobile device, based on the operator identifier obtained from the first database. Similar to the first database, this second database is also maintained by the carrier in our example and includes a mapping between the operator identifier (e.g., MDN) and the device or equipment identifier (e.g. MEID) associated with the mobile device. In step 405, the operator identifier obtained in step 403 is stored in association with the device identifier obtained in step 404, for example, at either the mobile device on which the client application is executing or at the application server, e.g., in a local memory device integrated with the application server or a separate database that is directly accessible to the server.

Although not shown in the example flowchart of FIG. 4, step 405 may further include storing additional identifier information specific to the mobile device (e.g., UDID associated with some versions of iOS smart mobile devices, as previously mentioned) in association with the operator identifier and device identifier. For example, such additional identifier information may be provided in the data communication request from the mobile client application. Therefore, this information can be used to quickly obtain the operator identifier that is also associated with the device in response to subsequent data communication requests from the client.

Once the identifier information has been stored, method 400 can proceed to step 412, in which an appropriate response is transmitted to the client application based on the initial data communication request and the obtained identifier information associated with the mobile device. Thus, step 406 corresponds to subsequent data communication access requests from the client application directed to a non-dedicated or shared destination data communication address assigned to the application server. Step 406 includes obtaining the previously stored operator identifier, device or equipment identifier, and other unique identifier associated with the mobile device (e.g., either from the server or from client).

In step 407, the aforementioned second database of the carrier is queried to determine whether the operator identifier to device identifier mapping is still valid, e.g., whether the operator identifier (e.g., MDN) has been modified since the last time the server was accessed by the client application for data communication. If the database indicates that the operator identifier is still active (e.g., user has not suspended communication services provided by the network operator) and that the stored identifier mapping is valid (e.g., device's MDN has not changed), then the operator identifier is considered to be valid and this operator/billing identifier is charged for the advanced data services provided to the user via the client application. In contrast to conventional solutions for determining the identifier, the steps of method 400 avoid any operationally intensive processing related to mapping data communication address to the operator identifier associated with the user's mobile device.

However, if in step 408, a determination is made that the operator identifier to device identifier mapping is no longer valid (e.g. MDN stored for device has been suspended or modified) then method 400 proceeds to step 409, which includes determining whether the second database including the mapping of operator identifier to device/equipment identifier supports query by the device identifier (as opposed to the obtained operator identifier. If so, in step 410, this database is queried accordingly to obtain the correct operator identifier, which is presumably up-to-date as the database in question is maintained by the mobile network operator, as noted previously. A performance advantage associated with the ability to query the database based on the device identifier is realized since the operator identifier can be retrieved using the device identifier associated with the mobile device rather than having to resort to the operationally intensive process of obtaining the operator identifier by tracking the data communication address assigned to the mobile device. For example, such tracking would require directing the client to use the dedicated destination address to obtain operator identifier information and assigning a unique source communication IP address to the device for all data communication requests. Although not shown in FIG. 4, it should be noted that in addition to determining whether the operator identifier is still valid, method 400 may also determine if the device specific identifier, for example, the MEID, associated with the device is still valid or active. For example, the network operator may use such a device specific identifier to monitor whether the mobile device was reported as being stolen. This allows the network operator to deactivate the device (or device identifier associated with the device) so as to preclude any further use of the device for accessing communication services through the operator's mobile communication network.

If this second carrier database does not allow querying based on the device identifier, then method 400 repeats steps 403 to 405, as described above, which includes obtaining the operator identifier by initiating a data communication request from the client application through the mobile communication to the application server using the dedicated destination address. For example, the application server can transmit a response to the client application that triggers the client application to reinitialize or reset the destination data communication address from the shared destination address to the dedicated destination address for use in subsequent data communication requests to the application server. However, this approach still mitigates any issues related to limiting network resources or performance as the process of mapping data communication address to the operator identifier associated with the mobile device is repeated only when it is determined that the stored operator identifier for the device is no longer valid (i.e., as opposed to tracking this mapping for each access request).

Steps 411-415 of method 400 pertain to the case where the operator and device/equipment identifier information is stored at the mobile device of the client application. As illustrated by these steps, additional validation of the stored information can optionally be performed, for example, using a push message include additional device-specific identifier information (e.g., UDID) that includes a random string, as described above with respect to method 300 of FIG. 3. A person skilled in the relevant art given this description would appreciate that the random string may be generated using any number of well-known techniques, also as described above. As the client application is required to return the random string along with operator and device/equipment identifiers to complete the validation, the potential for fraudulent use whereby the same valid operator identifier to device identifier mapping is distributed amongst different mobile device users is reduced, as discussed above.

Methods 300 and 400 of FIGS. 3 and 4, respectively, provide several advantages over conventional techniques for obtaining an operator's billing identifier associated with a mobile device of a user or subscriber when such information is not available for data communications initiated at the mobile device through a mobile communication network to an associated application server. For example, methods 300 and 400 can be used even when a mobile communication application on the mobile device is restricted, for example, by the device manufacturer, from accessing the operator identifier from the device itself.

In particular, method 400 provides efficient network based techniques that can be implemented in equipment of the operator's mobile communication network for automatically obtaining the operator identifier associated with the mobile device without significantly impacting network resources, performance, or user experience. Furthermore, method 400 uses the operator identifier to device identifier mapping, as described above, to minimize the use of the operationally intensive process of mapping back from a data communication address assigned to the device to the operator identifier associated with the device. Moreover, method 400 also provides the additional functionality for validating stored identifier information by using, for example, a message push mechanism based on a randomly generated string.

Example Mobile Devices

Those skilled in the art presumably are familiar with the structure, programming and operations of the various types of mobile devices. For completeness and ease of explanation, the relevant functional elements/aspects of the two exemplary mobile devices 13a and 13b of FIG. 1 will be described at a high-level with respect to the example mobile devices/devices illustrated in FIGS. 5A and 5B, respectively. However, it would be apparent to those skilled in the art that mobile devices 13a and 13b, as described above, are not intended to be limited to the examples shown in FIGS. 5A and 5B.

Figure 5B:
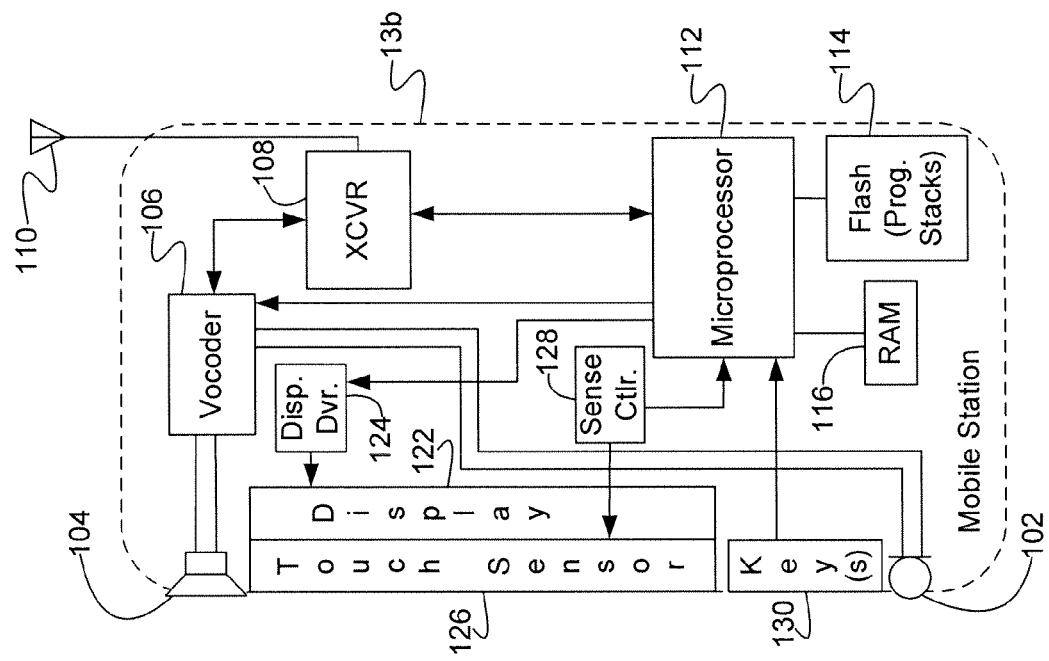
FIG. 5B is a high-level functional block diagram of an exemplary touch screen type mobile device.
Figure 5A:
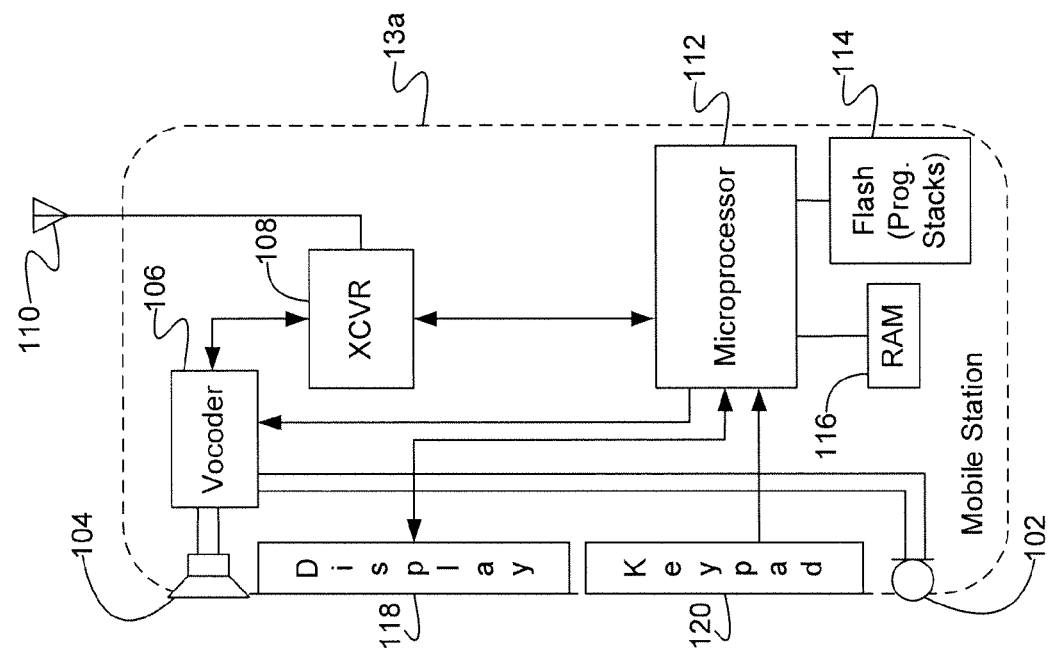
FIG. 5A is a high-level functional block diagram of an exemplary non-touch type mobile device.

For purposes of such a discussion, FIG. 5A provides a block diagram illustration of an exemplary mobile device 13a that does not have a touch-screen display interface (i.e., a non-touch type mobile device). Although the mobile device 13a may be a smart-phone or may be incorporated into another device, such as a personal digital assistant (PDA) or the like, for discussion purposes, the illustration shows the mobile device 13a is in the form of a handset. The handset embodiment of the mobile device 13a functions as a normal digital wireless telephone station. For that function, mobile device 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. To function appropriately in modern mobile communications networks, the handset 13a would be configured for digital wireless communications using one or more of the common network technology types. The concepts discussed here encompass embodiments of the mobile device 13a utilizing any digital transceivers that conform to current or future developed digital wireless communication standards. Mobile device 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile device 13a includes a display 118 for displaying messages, menus or the like, call related information dialed by the user, calling party numbers. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during the execution of a client application, invoked by the user to access one or more advanced data or web services provided by the carrier, as discussed previously. As will described in further detail below, mobile device 13a includes a processor and programming stored in device memory, which is used to configure the processor so that the mobile device is capable of performing various desired functions, including functions involved in delivering enhanced data services provided by the carrier via the client application.

In the example device shown in FIG. 5A, a microprocessor 112 serves as a programmable controller for mobile device 13a. Microprocessor 112 is configured to control all operations of the mobile devices/devices including any operations associated with one or more client applications that it executes. Further, microprocessor 112 performs any operations in accordance with programming associated with such client application(s) in addition to other standard operations in general for the device.

Also as shown in FIG. 5A, mobile device 13a includes flash type program memory 114, for storage of various "software" or "firmware" program routines and mobile configuration settings, for example and without limitation, the mobile directory number (MDN) and/or mobile identification number (MIN). Mobile device 13a may also include a non-volatile random access memory (RAM) 116 for a working data processing memory. As would be apparent to a person skilled in the relevant art given this description, other storage devices or configurations may be added to or substituted for those in the example. In an example, a flash-based program memory 114 stores firmware (including a device boot routine), device driver software, an operating system, processing software for client application functions/routines and any control software specific to the carrier or mobile device. In operation, the programming associated with the boot routine stored in program memory 114 (i.e., the firmware) is loaded into (e.g., into cache memory of microprocessor 112) and executed by the microprocessor 112, for example, when the device is power-cycled or reset. Memory 114 may also be used to store any of a wide variety of other applications, for example and without limitation, a web browser applications and messaging service applications for sending and receiving text and/or multimedia messages. Memory devices 114 and 116 can also be used to store various data, such as telephone numbers and server addresses, downloaded data such as multimedia content, and various data input by the user.

For purposes of such a discussion, FIG. 5B provides a block diagram illustration of an exemplary mobile device 13b having a touch-screen user interface. As such, mobile device 13b can be any smart mobile device (e.g., smart-phone or tablet device). Although possible configured somewhat differently, at least logically, a number of the elements of the exemplary touch screen type mobile device 13b are similar to the elements of mobile device 13a, and are identified by like reference numbers in FIG. 5B. For example, the touch screen type mobile device 13b includes a microphone 102, speaker 104 and vocoder 106, for audio input and output functions, much like in the earlier example. The mobile device 13b also includes a at least one digital transceiver (XCVR) 108, for digital wireless communications, although the handset 13b may include an additional digital or analog transceiver. The concepts discussed here encompass embodiments of the mobile device 13b utilizing any digital transceivers that conform to current or future developed digital wireless communication standards. As in mobile device 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of mobile device 13a, a microprocessor 112 serves as a programmable controller for the mobile device 13b, in that it controls all operations of the mobile device 13b in accord with programming that it executes, for all normal operations, and for operations involved in the procedure for obtaining operator identifier information under consideration here. Like mobile device 13a, mobile device 13b includes flash type program memory 114, for storage of various program routines and mobile configuration settings. The mobile device 13b may also include a non-volatile random access memory (RAM) 116 for a working data processing memory. Of course, other storage devices or configurations may be added to or substituted for those in the example. Hence, as outlined above, the mobile device 13b includes a processor, and programming stored in the flash memory 114 configures the processor so that the mobile device is capable of performing various desired functions, including in this case the functions associated with a client application executing on the mobile device, involved in the techniques for providing advanced data services by the carrier.

In the example shown in FIG. 5B, the user input elements for mobile device 13b include a touch-screen display and a keypad. The keypad of mobile device 13b may include one or more hardware keys 130. For example, the keypad may be implemented as a sliding keyboard of mobile device 13b and keys 130 may correspond to the keys of such a keyboard. Alternatively, the hardware keys (including keyboard) of mobile device 13b may be replaced by soft keys presented in an appropriate arrangement on the touch-screen display. The soft keys presented on the touch-screen display would operate similarly to hardware keys and thus, can be used to invoke the same user interface functions as with the hardware keys.

In general, the touch-screen display of mobile device 13b is used to present information (e.g., text, video, graphics or other content) to the user of the mobile device. Such a touch-screen display may be, for example and without limitation, a capacitive touch-screen display. In operation, the touch-screen display detects the occurrence and relative location of user input with respect to the viewable area of the display screen. The user input may be an actual touch of the display device with the user's finger, stylus or similar type of peripheral device used for user input with a touch-screen. Use of a touch-screen display as part of the user interface enables a user to interact directly with the information presented on the display.

Accordingly, the exemplary mobile device 13b includes a display 122, which the microprocessor 112 controls via a display driver 124, to present visible outputs to the device user. The mobile device 13b also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile device 13b. The microphone 102 and speaker 104 may be used as additional user interface elements, for audio input and output.

The structure and operation of the mobile devices 13a and 13b, as outlined above, were described to by way of example, only.

As shown by the above discussion, functions relating to the delivery of advanced data services, via a graphical user interface or client application (e.g., client application 215 of FIG. 2, described above) of a mobile device, may be implemented on computers connected for data communication via the components of a packet data network, operating as a mobile communication network, as shown in FIG. 1. Although special purpose devices may be used, such devices also may be implemented using one or more hardware platforms intended to represent a general class of data processing device commonly used to run "server" programming so as to implement the functions discussed above in FIGS. 1-4, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used to store operator and device identifier information. The software code is executable by the general-purpose computer that functions as the application server. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for automatically obtaining operator identifier information based on data communication for a mobile device through a mobile communication network to an application server, in essentially the manner performed in the implementations discussed and illustrated herein.

Example General Purpose Computer Systems

Figure 6:
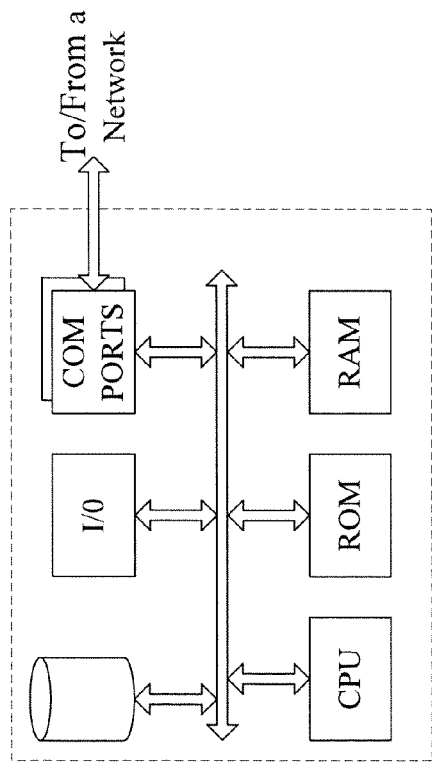
FIG. 6 is a simplified functional block diagram of an exemplary computer that may be configured as a host or server, for example, to function as the application server in the system of FIG. 3.
Figure 7:
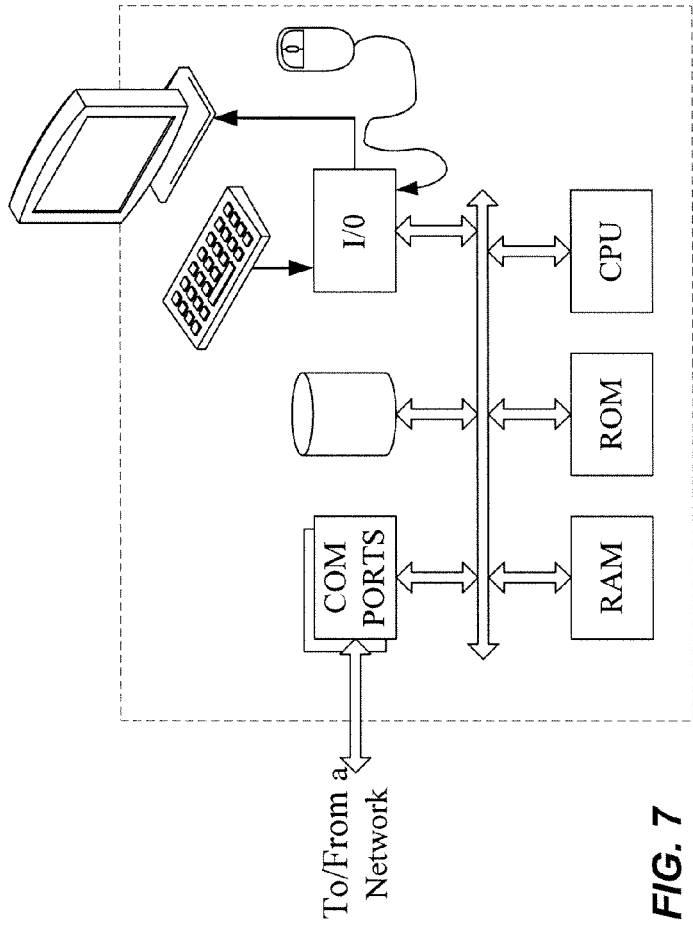
FIG. 7 is a simplified functional block diagram of an exemplary personal computer or other work station or terminal device.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of automatically obtaining the operator identifier for providing advanced or premium data services to a mobile device user, as outlined above, may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the application service provider into the computer platform of the mobile communication server that will be the application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings (e.g., databases 260 and 270 of FIG. 2). Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Conclusion

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising steps of:
   detecting, by an application server, a first data communication request requesting access to a function of a data service associated with the application server, directed to a first destination data communication address, received from a mobile communication application of a mobile device through a mobile communication network, the first data communication request including the first destination data communication address, and inclusion of the first destination data communication address in the first data communication request causing the mobile communication network to assign a unique source data communication address to the mobile device in the mobile communication network;
   responsive to detection of the first data communication request directed to the first destination data communication address, obtaining:
      from a database of the mobile communication network, an operator identifier associated with the unique source data communication address and assigned to the mobile device by an operator of the mobile communication network, the operator identifier to be used in execution of the mobile communication application, and
      a device specific identifier for the mobile device;
   transmitting a data communication response to the mobile communication application based on the first data communication request and the obtained operator and device specific identifiers associated with the mobile device, wherein:
      the data communication response causes the mobile communication application to send subsequent data communication requests to the application server using a second destination data communication address,
      the second destination data communication address is different from the first destination data communication address, and
      inclusion of the second destination data communication address in the subsequent data communication requests causes the mobile communication network to assign a source data communication address to the mobile device, wherein the source data communication address is shared concurrently among the mobile device and a plurality of other mobile devices communicating through the mobile communication network; and
   storing the obtained operator identifier and the device specific identifier associated with the mobile device, for further use in response to the subsequent data communication requests from the mobile communication application.

2. The method of claim 1, wherein the transmitting the data communication response further comprises:
   providing the function of the data service to the mobile communication application as requested in the first data communication request, after the second destination data communication address is used by the mobile communication application.

3. The method of claim 1, wherein the data communication response includes the second destination data communication address for use by the mobile communication application in sending the subsequent data communication requests to the application server.

4. The method of claim 1, wherein the second destination data communication address is stored locally at the mobile device executing the mobile communication application.

5. The method of claim 1, wherein the unique source data communication address, assigned to the mobile device by the mobile communication network, includes a unique source port number.

6. The method of claim 1, wherein the device specific identifier is at least one of a mobile equipment identifier associated with the mobile device or a unique device identifier assigned to the mobile device by a manufacturer of the mobile device.

7. The method of claim 1, wherein the device specific identifier includes a mobile equipment identifier associated with the mobile device, and wherein the obtaining of the device specific identifier comprises:
- sending a query including the operator identifier associated with the mobile device to a database of the mobile communication network storing a mapping of the operator identifier to the mobile equipment identifier of the mobile device; and
- receiving, from the database, a response to the query, the response including the mobile equipment identifier associated with the mobile device.

8. The method of claim 7, further comprising:
- detecting, by the application server, a second data communication request requesting access to the function of the data service provided by the application server, directed to the second destination data communication address, received from the mobile communication application of the mobile device through the mobile communication network; and
- responsive to detection of the second data communication request directed to the second destination data communication address, validating the stored operator identifier and the stored mobile equipment identifier associated with the mobile device using the second database of the mobile communication network.

9. The method of claim 8, wherein the validating further comprises:
- when the stored operator identifier and the stored mobile equipment identifier are successfully validated, providing the function of the data service to the mobile communication application as requested in the second data communication request; and
- when the stored operator identifier or the stored mobile equipment identifier are not successfully validated, obtaining a new operator identifier for the mobile device.

10. The method of claim 9, wherein the obtaining of the new operator identifier comprises:
- determining whether the second database allows queries based on the mobile equipment identifier associated with the mobile device;
- when it is determined the second database allows queries based on the mobile equipment identifier, querying the second database for the new operator identifier for the mobile device based on the mobile equipment identifier associated with the mobile device; and
- when it is determined the second database does not allow queries based on the mobile equipment identifier, transmitting a second data communication response to the mobile communication application, the second data communication response causing the mobile communication application to send a new data communication request, directed to the first destination data communication address;
- responsive to detection of the new data communication request, directed to the first destination data communication address, obtaining:
  - the new operator identifier from a first database of the mobile communication network based on the mobile equipment identifier associated with the mobile device, and
  - a new mobile equipment identifier from a second database of the mobile communication network based on the obtained new operator identifier;
- transmitting a third data communication response to the mobile communication application based on the new data communication request and the obtained new operator and mobile equipment identifiers associated with the mobile device, the third data communication response causing the mobile communication application to send subsequent data communication requests to the application server using the second destination data communication address; and
- storing the obtained new operator and mobile equipment identifiers associated with the mobile device, for further use in response to the subsequent data communication requests from the mobile communication application.

11. The method of claim 7, wherein the storing comprises:
- storing the obtained operator identifier in association with the obtained mobile equipment identifier at a local data store of the application server.

12. The method of claim 7, wherein the device specific identifier further includes a unique device identifier associated with the mobile device, the first data communication request received from the mobile communication application of the mobile device includes the unique device identifier, and the storing comprises:
- storing the obtained operator identifier and the obtained mobile equipment identifier for the mobile device in association with the unique device identifier received in the first data communication request from the mobile communication application.

13. The method of claim 12, wherein the storing comprises:
- transmitting the obtained operator identifier and the obtained mobile equipment identifier in association with the received unique device identifier to the mobile communication application for storage at the mobile device.

14. The method of claim 13, further comprising:
- detecting, by the application server, a second data communication request directed to the second destination data communication address, received from the mobile communication application of the mobile device through the mobile communication network, the second data communication request including the associated operator, mobile equipment and unique device identifiers; and
- responsive to detection of the second data communication request directed to the second destination data communication address, validating the operator identifier and the mobile equipment identifier for the mobile device based on the second data communication request.

15. The method of claim 14, wherein the validating comprises:
- generating a first random string of characters based on the unique device identifier included in the second data communication request;
- transmitting a communication message including the generated first random string to the mobile communication application of the mobile device, the communication message causing the mobile communication application of the mobile device to generate and return a second random string based on the unique device identifier associated with the mobile device;

verifying the second random string returned from the mobile communication application matches the generated first random string; and transmitting a response to the mobile communication application based on the verification.

16. A method comprising steps of:

for a mobile communication application that does not yet have access to a network operator assigned identifier associated with a mobile device of a user, receiving at an application server a first data communication for the mobile device through a mobile communication network of the operator, the first data communication including a first destination data communication address assigned to the server;

responsive to reception of the first data communication including the first destination address, the mobile communication network assigning a unique data communication address for use by the mobile device of the user;

responsive to reception of the first data communication, querying a database of the mobile communication network based on the assigned unique data communication address, to obtain the operator assigned identifier for the mobile device of the user;

storing the obtained operator assigned identifier of the mobile device in association with a unique device identifier associated with the mobile device obtained during the first data communication, for access by the mobile communication application;

when the mobile communication application has access to the operator assigned identifier of the mobile device, receiving at the application server a second data communication for the mobile device through the mobile communication network, the second data communication including a second destination data communication address assigned to the server, the second destination data communication address being different from the first destination data communication address;

responsive to reception of the second data communication including the second destination data communication address, the mobile communication network assigning to the mobile device of the user a second data communication address that is shared concurrently among a plurality of mobile devices communicating through the mobile communication network; and responsive to reception of the second data communication including the second data communication address, obtaining the stored operator identifier of the mobile device based on the unique device identifier associated with the mobile device for further use in execution of the application.

17. An application server, comprising:

a network communication device configured to exchange data communications through a mobile communication network, the mobile communication network including at least one database accessible to the network communication device;

a processor coupled to the network communication device;

a storage device accessible to the processor; and an application program in the storage device, execution of each of the application program by the processor configuring the application server to exchange data communications with an associated mobile communication client application of a mobile device through the mobile communication network, wherein the processor is configured to perform functions including:

a data communication detection function to detect a first data communication request, requesting access to a function of a data service associated with the application server, in response to a signal from the network communication device, the first data communication request directed to a first destination data communication address and received from the mobile communication application through the mobile communication network, the first data communication request including the first destination data communication address, and inclusion of the first destination data communication address in the first data communication request causing the mobile communication network to assign a unique source data communication address to the mobile device in the mobile communication network;

an operator identifier retrieval function to obtain, from a database of the mobile communication network, an identifier associated with the unique source data communication address and assigned to the mobile device by an operator of the mobile communication network, the operator identifier to be used in execution of the mobile communication application;

a device identifier function to obtain a device specific identifier for the mobile device;

a communication response function to transmit a data communication response to the mobile communication application based on the first data communication request and the obtained operator and device specific identifiers associated with the mobile device, wherein:

the data communication response causing the mobile communication application to send subsequent data communication requests to the application server using a second destination data communication address, the second destination data communication address is different from the first destination data communication address, and inclusion of the second destination data communication address in the subsequent data communication requests causes the mobile communication network to assign a source data communication address to the mobile device, wherein the source data communication address is shared concurrently among the mobile device and a plurality of other mobile devices communicating through the mobile communication network; and a storage function to store the obtained operator identifier and the device specific identifier associated with the mobile device, for further use in response to the subsequent data communication requests from the mobile communication application.

18. An article of manufacture, comprising a non-transitory computer-readable medium and computer-executable instructions embodied in the medium that, if executed by a computing device, cause the computing device to perform functions including functions to:

detect, by an application server, a first data communication request requesting access to a function of a data service associated with the application server, directed to a first destination data communication address, received from a mobile communication application of a mobile device through a mobile communication network, the first data communication request including the first destination data communication address, and inclusion of the first destination data communication address in the first data communication request causing the mobile communication network to assign a unique source data communication address for use by the mobile device in the mobile communication network;

responsive to detection of the first data communication request directed to the first destination data communication address, obtain:

from a database of the mobile communication network, an identifier associated with the unique source data communication address and assigned to the mobile device by an operator of the mobile communication network, the operator identifier to be used in execution of the mobile communication application, and a device specific identifier associated with the obtained operator identifier for the mobile device;

transmit a data communication response to the mobile communication application based on the first data communication request and the obtained operator and device specific identifiers associated with the mobile device, wherein:

the data communication response causes the mobile communication application to send subsequent data communication requests to the application server using a second destination data communication address, the second destination data communication address is different from the first destination data communication address, and inclusion of the second destination data communication address in the subsequent data communication requests causes the mobile communication network to assign a source data communication address to the mobile device, wherein the source data communication address is shared concurrently among the mobile device and a plurality of other mobile devices communicating through the mobile communication network; and store the obtained operator identifier and the device specific identifier associated with the mobile device, for further use in response to the subsequent data communication requests from the mobile communication application.

19. The article of claim 18, wherein the device specific identifier includes a mobile equipment identifier associated with the mobile device, and wherein the function to obtain the device specific identifier comprises functions to:

send a query including the operator identifier associated with the mobile device to a database of the mobile communication network storing a mapping of the operator identifier to the mobile equipment identifier of the mobile device; and receive a response to the query containing the mobile equipment identifier associated with the mobile device.

20. The article of claim 19, wherein the instructions if executed by the computing device, cause the computing device to perform functions further including functions to:

detect, at the application server, a second data communication request requesting access to the function of the data service provided by the application server, directed to the second destination data communication address, received from the mobile communication application of the mobile device through the mobile communication network; and responsive to detection of the second data communication request directed to the second destination data communication address, validate the stored operator identifier and the stored mobile equipment identifier associated with the mobile device using the second database of the mobile communication network.

21. The article of claim 19, wherein the function to store comprises a function to:

store the obtained operator identifier in association with the obtained mobile equipment identifier at a local data store of the application server.

22. The article of claim 19, wherein the device specific identifier further includes a unique device identifier associated with the mobile device, the first data communication request received from the mobile communication application of the mobile device includes the unique device identifier, and the function to store comprises a function to:

store the obtained operator identifier and the obtained mobile equipment identifier for the mobile device in association with the unique device identifier received in the first data communication request from the mobile communication application.

23. The article of claim 22, wherein the function to store comprises a function to:

transmit the obtained operator identifier and the obtained mobile equipment identifier in association with the received unique device identifier to the mobile communication application for storage at the mobile device.

24. The article of claim 23, wherein the instructions if executed by the computing device, cause the computing device to perform functions further including functions to:

detect, at the application server, a second data communication request directed to the second destination data communication address, received from the mobile communication application of the mobile device through the mobile communication network, the second data communication request including the associated operator, mobile equipment and unique device identifiers; and responsive to detection of the second data communication request directed to the second destination data communication address, validate the operator identifier and the mobile equipment identifier for the mobile device based on the second data communication request.

25. The article of claim 24, wherein the function to validate comprises functions to:

generate a first random string of characters based on the unique device identifier included in the second data communication request;

transmit a communication message including the generated first random string to the mobile communication application of the mobile device, the communication message causing the mobile communication application of the mobile device to generate and return a second random string based on the unique device identifier associated with the mobile device;

verify the second random string returned from the mobile communication application matches the generated first random string; and transmit a response to the mobile communication application based on the verification.

* * * * *